Nov. 14, 1961     L. W. WIGHTMAN     3,008,777
DYNAMOELECTRIC MACHINE CONSTRUCTION
Filed Dec. 2, 1959
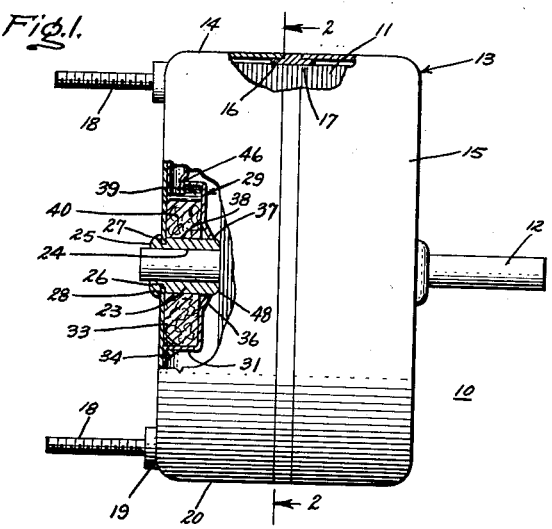
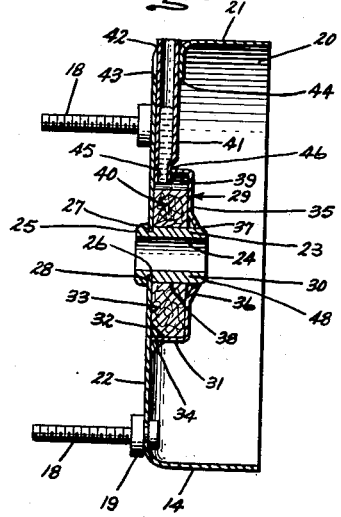
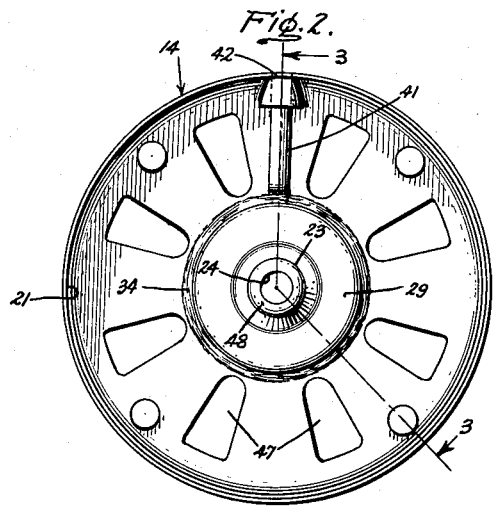
Inventor:
Lawrance W. Wightman,
by John M. Stoudt
Attorney.

United States Patent Office 3,008,777
Patented Nov. 14, 1961

3,008,777
DYNAMOELECTRIC MACHINE CONSTRUCTION
Lawrance W. Wightman, Fort Wayne, Ind., assignor to General Electric Company, a corporation of New York
Filed Dec. 2, 1959, Ser. No. 856,715
4 Claims. (Cl. 308—132)

This invention relates to dynamoelectric machines and more particularly to an improved end shield and bearing assembly.

In the construction of dynamoelectric machines, it has been conventional to provide the machine with a pair of cast metallic end shield assemblies, usually cup-shaped, each having an integrally formed bearing support structure which has an axial dimension somewhat longer than the axial length of the bearing to be supported. Further, in order that suitable lubrication is provided to the bearing journalling surface during motor operation, the end shield assembly is furnished, adjacent the bearing support, with an integrally formed oil reservoir which communicates with the bearing journalling surface. Although this arrangement affords the requisite rigid support for the bearing and provides the necessary reservoir space for holding lubricant retaining material, this type of construction is relatively complex and expensive to produce, and due to the fact that it is cast, it takes up a relatively large amount of space in the motor. Thus, in the mass production of small and fractional horsepower type motors having very small circumferential dimensions, where space and cost are extremely important factors in the successful manufacture of such motors, it has not been practical to use the cast type end shield construction.

Consequently, in an attempt to obtain both economy in space and cost, fractional horsepower motors generally incorporate an end shield construction in which one end of the bearing, usually a sleeve type bearing, is directly secured to the end shield which is economically stamped from suitable sheet steel material. Although this arrangement is highly desirable from the standpoint of design and of low cost, it has not been entirely satisfactory for other reasons and has introduced other problems in the manufacture of motors. For example, since the bearing is secured and supported at only one of its ends on the end shield, providing the only means of support for the bearing, the place of securement is subjected to high stresses during motor operation, especially in those situations where the axial length of the bearing is relatively large as compared with the radial width. Thus, during motor operation, the bearing has a tendency to become loose, causing misalignment and excessive journal friction between the bearing and the revolving shaft. This, in turn, results in a marked decrease in motor efficiency as well as premature bearing failures. In addition, the end shield does not have a lubricant reservoir for retaining and supplying lubricant to the bearing journalling surface, adding the problem of adequate bearing lubrication.

Therefore, it is readily apparent from the foregoing that the provision of an inexpensive, yet satisfactory, end shield assembly having the desired degree of bearing support rigidity and adequate lubrication at a minimum of expense and space is a continuing problem in the motor industry.

Accordingly, it is a primary object of the present invention to provide an improved end shield assembly which is simple and novel in structure yet effectively supports the bearing to the end shield and provides a suitable lubricant reservoir for holding and supplying lubricant to the bearing journalling surface.

It is another object of this invention to provide an improved bearing mounting and lubricant reservoir arrangement for a bearing having one end projecting through an apertured sheet-like wall and secured thereto at a cost far less than has been heretofore accomplished by prior manufacturing procedures.

It is a further object of the invention to provide an improved bearing lubricant reservoir sealing arrangement for supporting the rotatable member of a dynamoelectric machine.

In carrying out the objects of this invention in one form thereof, I provide an improved end shield assembly in which a longitudinally extending sleeve bearing has one end projecting through an apertured wall of a sheet-like member and is secured thereto, as by staking or the like, for support thereby. A generally cup-shaped member, formed from sheet material, has an outer section arranged adjacent the wall, radially outward from the bearing, and has an inwardly extending section in snug engagement with the end of the bearing positioned away from the wall to support the latter bearing end. The cup-shaped member and wall, together with the outer longitudinal surface of the bearing, form a lubricant reservoir which surrounds the longitudinal outer surface of the bearing and has lubricant absorbent material provided therein for holding and supplying lubricant to the bearing. The edge of the outer section of the cup-shaped member is joined to the wall by an adhesive bonding means, providing a rigid securement between the wall and cup-shaped member as well as effectively sealing the reservoir. This arrangement, while utilizing the highly desirable end shield construction wherein a bearing has one of its ends projecting through an apertured sheet-like member and is secured thereto, effectively eliminates the inherent disadvantages described above previously associated with the use of such end shield construction.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawing:

FIG. 1 is a side view, partially broken away and partially in cross section, of a dynamoelectric machine embodying the improved end shield assembly of the present invention;

FIG. 2 is an end view of the end shield assembly, looking in direction of the arrows of FIG. 1; and FIG. 3 is a sectional view of the end shield assembly taken along lines 3—3 of FIG. 2 to show the novel bearing mounting and lubricant retaining reservoir in more detail.

Referring now to FIG. 1 of the drawing, there is shown a fractional horsepower type electric motor, indicated generally by numeral 10, having a stator core 11 of standard construction and a rotor (not shown) suitably secured to a rotatable rotor shaft 12. Stator core 11 is housed within a frame, generally indicated at 13, formed by a pair of end shield assemblies 14 and 15 which may be suitably secured to the stator core 11, as by welding or the like, shown at 16, then to the outer periphery 17 of the stator core. Means for mounting the motor to a stationary support (not shown) are provided in the form of a plurality of axially extending bolts 18 attached to end shield assembly 14, as by a bushing and groove arrangement denoted at 19.

Referring now to the improved end shield assembly constructed in accordance with the present invention, in particular FIGS. 2 and 3, only end shield assembly 14 has been shown in detail for reasons of simplicity of illustration and description, but it is understood that the other end shield assembly 15 may be constructed in the same manner. Assembly 14 comprises a cup-shaped end shield member 20, preferably stamped from a sheet of steel material or the like, having an outer flanged portion 21 and a relatively flat inner base or wall portion 22. In the illustrated form (see FIG. 3 in particular) a sleeve bearing 23, preferably of the porous sintered type having a smooth axially extending inner bore 24, is provided for rotatably supporting one end of the rotor shaft 12. Bearing end 25 is fastened to end shield member 20, as indicated at 26, such as by initially forming end 25 with an outer diameter of reduced size, projecting the end through an accommodating opening 27 positioned in wall 22 of the end shield, and peening over or staking bearing end 25 against the outer surface 28 of wall 22, adjacent opening 27.

In order to complete the bearing support arrangement, a substantially cup-shaped member 29, preferably stamped from suitable sheet material such as steel, is furnished at the other end, 30, of bearing 23. In the preferred embodiment, member 29 comprises an outer axially extending cylindrical section 31 of predetermined length having its edge rigidly secured to inner surface 33 of the end shield wall 22 at a position radially outward from bearing end 25. The securing means, preferably an adhesive type bonding material 34 such as an epoxy organic resin known as EA–200 (Copolymers Inc.) having a polyamide hardener or curing agent, is shown as being provided around the entire circumference of edge 32. Integrally formed with section 31 and axially spaced from end shield wall 22 a predetermined distance, is a section 35 which extends inward from section 31 and terminates a central conical portion 36 for accommodating and supporting bearing end 30. Preferably, conical portion 36 is provided with an opening 37 which has a preformed diameter slightly smaller than the outer diameter of bearing 23 in order that a relatively snug engagement is provided between the outer longitudinal surface 38 of bearing 23, adjacent bearing end 30, and member 29.

In addition to providing a rigid support between end shield member 20 and bearing end 30, member 29 along with the outer longitudinal surface 38 of bearing 23 and end shield wall 22, also forms a lubricant reservoir cavity, generally shown at 39, surrounding bearing 23. The cavity is substantially filled with lubricant retaining means, such as an oil impregnated felt pad 40. Lubricant is supplied from the reservoir and fed to the bearing bore 24 at a predetermined rate through the porous sintered bearing in the manner well-known in the art. Since edge 32 of member 29 is bonded to wall 22 along the entire perimeter thereof, and there is a snug fit between portion 36 of member 29 and the outer surface of bearing end 30, the lubricant reservoir is effectively sealed (other than the outer surface 38 of bearing 23 through which the lubricant is fed to the bore 24). Air warmed by the operation of motor 10 is thus precluded from coming into contact with the oil impregnated pad 40 arranged in the reservoir, and excessive leakage of lubricant to the interior of the motor from the reservoir which might otherwise occur is prevented.

In order to permit the addition of lubricant to the reservoir from time to time as needed, a tube 41, may be provided to communicate with the reservoir cavity 39 as illustrated in the drawing. The tube has its upper end 42 (as viewed in the drawing) projecting through an aperture 43, residing in groove 44 of end shield member 20, to a point accessible from outside of the end shield. At its lower end 45 which is formed with a reduced diameter for a predetermined length, tube 41 extends into reservoir cavity 39 through a corresponding suitable tube receiving aperture 46, positioned on member 29 in substantial alignment with groove 44 of end shield member 20. The reduced size of tube end 45 and its receiving aperture 46 prevents the tube from extending into cavity 39 for more than the desired radial distance.

The manner in which the improved end shield assembly 14 of the present invention may be produced will now be described. End shield member 20 is initially stamped from sheet material into the general cup-shaped configuration shown by the figures. During the formation of member 20, the holes for receiving motor mounting bolts 18 and the bearing accommodating opening 27 may be provided. Simultaneously with the foregoing operation, if desired, suitable motor ventilating apertures 47 may be furnished in end shield wall 22. In this manufacturing step, end shield member 20 may also be cut at a suitable location and the area adjacent one side of the cut may be creased inwardly to form aperture 43 and radially extending groove 44 to receive and hold lubricant adding tube 41. Thereafter, bearing end 25, formed with an outer diameter of reduced size, is inserted through opening 27 and staked or peened over to fixedly attach bearing end 25 to member 20. Preferably, when this operation has been completed, bearing bore 24 is substantially in perpendicular alignment with end shield surface 33.

Bonding material 16 is applied in its uncured state, by any well known means, onto end shield surface 33 in the form of a ring spaced radially outward from opening 27 at the location where edge 32 of member 29 will eventually be joined to end shield member 20. Of course, it will be obvious to those skilled in the art that material 16 could equally as well be applied along the entire perimeter of edge 32, or to both surfaces prior to the assembly of the parts.

Tube 41 is then properly positioned on the end shield member 20 with tube end 42 projecting through aperture 43 and resting in groove 44 and with tube end 45 being pressed into material 16 against end shield surface 33 and extending toward bearing 23. The oil impregnated pad 40 is then placed around the outer longitudinal surface 38 of bearing 23 and finally cup-shaped member 29 is assembled onto the end shield with edge 32 being tightly pressed against bonding material 16 and with conical portion 36 being in tight engagement with the outer bearing surface 38 adjacent bearing end 30.

Since, in the preferred form, conical portion 36 of member 29 is fabricated from sheet material and tapered away from end shield wall 22, it provides, in effect, a spring-like action during assembly and will deform slightly to allow its passage over bearing end 30, but will retain its annular shape and tightly engage the bearing once assembled thereto. If desired, as shown in the drawing, for purposes of facilitating the assembly of the parts, bearing end 30 may be provided with a rounded or tapered peripheral edge 48 to assist in guiding portion 36 over the end of the bearing.

With all the individual component parts of end shield assembly 14 in their respective finally assembled relation, bonding material 16 is caused to be cured or hardened by any suitable means not shown; e.g., kiln, to the point wherein it will retain the parts in a permanently fixed relationship.

Mounting bolts 18, of course, may be mounted on the end shield at any time during the assembly procedure, after the initial formation of end shield member 20. Once the end shield assembly has been produced in accordance with the foregoing, it can be conveniently attached to stator core 11 in the manner set forth heretofore.

It will be recognized and appreciated from the foregoing disclosure that the present invention permits the satisfactory use of the highly desirable and advantageous end shield construction in which one end of a longitudinally extending bearing is attached thereto. By an important aspect of this invention, the other end of the bearing is rigidly supported by a structure which also forms a part of a lubricant reservoir for retaining and supplying lubricant to the journalling surface and effectively seals the reservoir. In addition, while the novel structure provides the requisite degree of rigidity for supporting the bearing and the means for adequate bearing lubrication, the space utilized and cost involved is maintained at a minimum.

It should be apparent to those skilled in the art, while

I have shown and described what at present is considered to be the preferred embodiment of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. For use in a dynamoelectric machine, a first member formed from sheet material having a wall portion with an opening therein, a longitudinally extending sleeve bearing having one end thereof projecting through said opening and peened over against said wall portion to hold said bearing against axial and rotational movement relative to said member, a second member formed from sheet material having an outer section positioned adjacent said wall portion radially outward from said bearing and having a section extending inward to support the end of said bearing disposed away from said wall portion, said second member and said wall portion forming together with the outer longitudinal surface of said bearing a closed lubricant reservoir, lubricant absorbent material positioned in said reservoir and surrounding said bearing for retaining and supplying lubricant to said bearing, and adhesive bonding means joining the edge of said outer section to said wall portion thereby rigidly securing said second member to said wall portion.

2. For use in a dynamoelectric machine, and end shield assembly comprising a first member formed from sheet material having a wall portion with an opening therein, a longitudinally extending sleeve bearing having one end projecting through said opening and staked thereto for holding said bearing against axial and rotational movement relative to said first member, a second member formed from sheet material having an outer section positioned adjacent said wall portion radially outward from said bearing and having a section extending inward into tight engagement with the end of bearing disposed away from said wall portion to support said latter bearing end, said second member and said wall portion forming together with the outer longitudinal surface of said bearing a closed lubricant reservoir, lubricant absorbing material positioned in said reservoir and surrounding said bearing for retaining and supplying lubricant to said bearing, adhesive bonding means joining the edge of said outer section to said wall portion thereby rigidly securing said second member to said wall portion and effectively sealing said reservoir, and means communicating with said reservoir for adding lubricant to said lubricant absorbent material.

3. For use in a dynamoelectric machine, an end shield assembly comprising an end shield member formed from sheet material having a wall portion with an opening therein, a longitudinally extending sleeve bearing having one end initially formed with an outer diameter of reduced size projecting through said opening and peened over against said wall portion for holding said bearing against axial and rotational movement relative to said end shield member, a substantially cup-shaped member formed from sheet material having an outer substantially annular section positioned adjacent said wall portion radially outwardly from said bearing and having a section extending inward adjacent the end of said bearing disposed away from said wall portion to support said latter bearing end, said cup-shaped member and said wall portion forming together with the outer longitudinal surface of said bearing a closed lubricant reservoir, lubricant absorbent material positioned in said reservoir surrounding said bearing for retaining and supplying lubricant to said bearing, and adhesive bonding means disposed circumferentially around the edge of said outer annular section to rigidly secure said cup-shaped member to said wall portion and to seal said reservoir.

4. For use in a dynamoelectric machine, and end shield assembly comprising a substantially cup-shaped end shield member formed from sheet material having a wall portion with a central opening therein, a longitudinally extending sleeve bearing having one end projecting through said central opening and staked to said end shield member for holding said bearing against axial and rotational movement relative thereto, a second substantially cup-shaped member formed from sheet material having an outer annular section positioned adjacent said wall portion radially outward from said bearing and having a section extending inward into tight sealing engagement with the outer longitudinal surface adjacent the end of said bearing disposed away from said wall portion to support said latter bearing end, said end shield member and said cup-shaped member forming together with the outer longitudinal surface of said bearing a closed lubricant reservoir, lubricant absorbent material positioned in said reservoir surrounding said bearing for retaining and supplying lubricant to said bearing, adhesive bonding means disposed circumferentially around the edge of said outer annular section to rigidly secure said second cup-shaped member to said wall portion and to seal said reservoir, and means communicating with said reservoir for adding lubricant to said lubricant absorbent material.

References Cited in the file of this patent

UNITED STATES PATENTS

| | | |
|---|---|---|
| 2,272,029 | Benson | Feb. 3, 1942 |
| 2,602,785 | Wiles | July 8, 1952 |
| 2,705,223 | Renfrew et al. | Mar. 29, 1955 |